Figure 1:
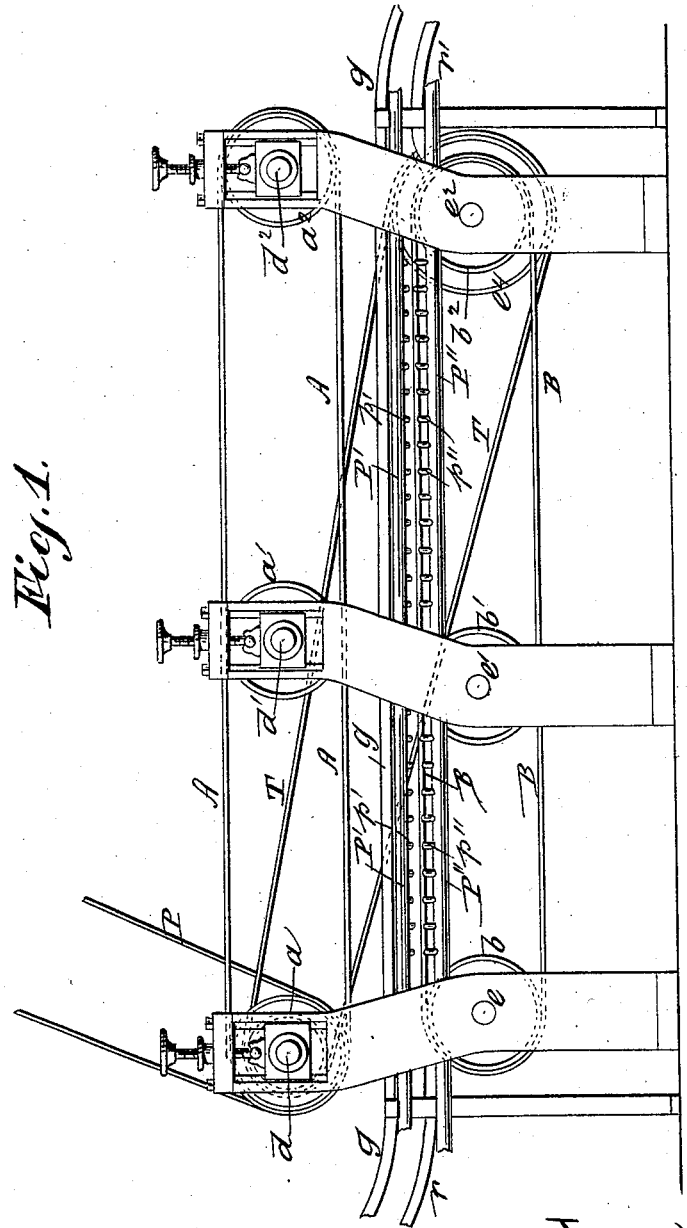

(No Model.)  3 Sheets—Sheet 1.

O. S. FELLOWS.
MEANS FOR REMOVING SUPERFLUOUS SOLDER FROM SHEET METAL CANS.

No. 595,704. Patented Dec. 21, 1897.

Witnesses.
D. W. Gardner.
Louis A. Rowley.

Inventor:
Olin S. Fellows
By his Attorney
George William Miatt

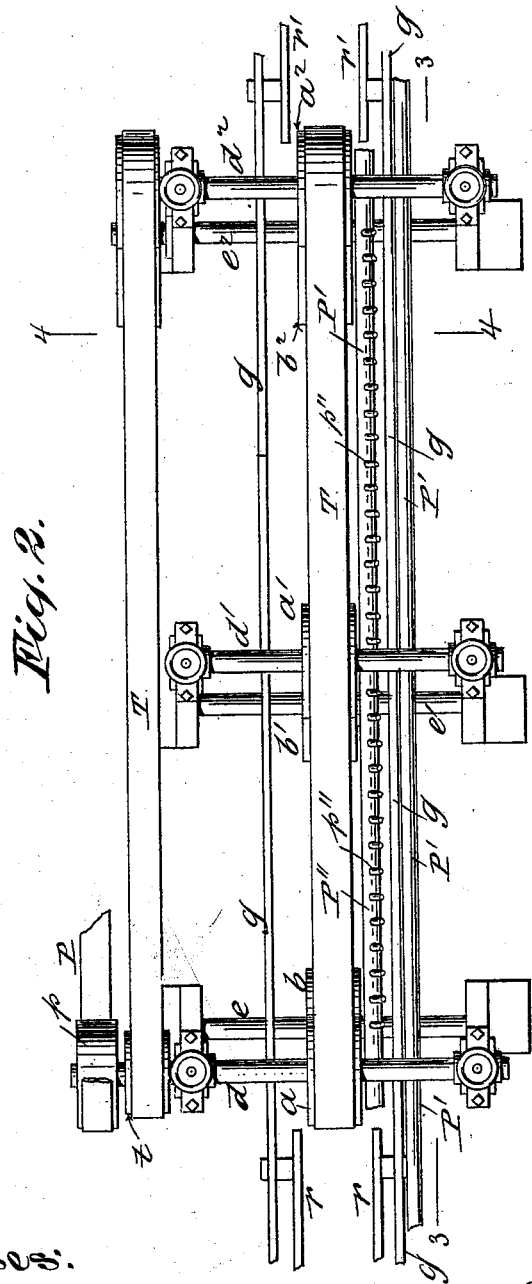

(No Model.) 3 Sheets—Sheet 3.
O. S. FELLOWS.
MEANS FOR REMOVING SUPERFLUOUS SOLDER FROM SHEET METAL CANS.
No. 595,704. Patented Dec. 21, 1897.
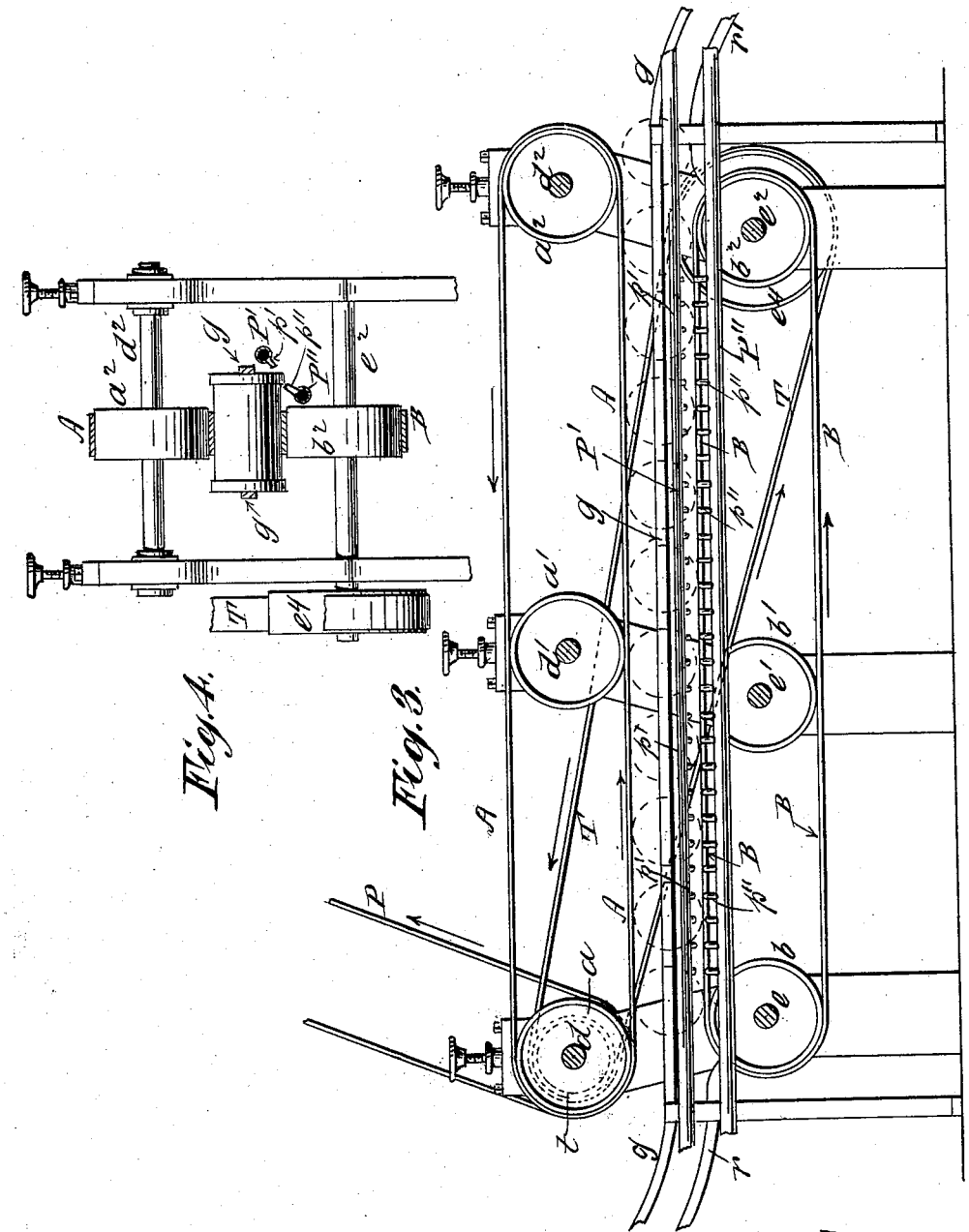

UNITED STATES PATENT OFFICE.

OLIN S. FELLOWS, OF MIDDLETOWN, NEW YORK.

MEANS FOR REMOVING SUPERFLUOUS SOLDER FROM SHEET-METAL CANS.

SPECIFICATION forming part of Letters Patent No. 595,704, dated December 21, 1897.

Application filed May 10, 1897. Serial No. 635,904. (No model.)

*To all whom it may concern:*

Be it known that I, OLIN S. FELLOWS, a citizen of the United States, residing at Middletown, in the county of Orange and State of New York, have invented certain new and useful Improvements in Means for Removing Superfluous Solder from Sheet-Metal Cans, of which the following is a specification sufficient to enable others skilled in the art to which the invention appertains to make and use the same.

My invention relates to the removal of superfluous solder from the end plates and adjoining portions of sheet-metal cans after they have left the soldering-bath; and the invention consists, essentially, in simultaneously forwarding the cans, rotating them on their axes, and subjecting them to a fluid-blast in such manner as to remove superfluous solder taken up by the exterior surfaces of the cans while passing through the solder-bath during the operation of soldering the end plates to the can-bodies, substantially as hereinafter set forth.

In the accompanying drawings for convenience of illustration I show apparatus similar to that set forth in my application, Serial No. 605,598, filed September 12, 1896, for forwarding and rotating the cans, the difference being that in said prior application centrifugal force is employed to remove the superfluous solder, whereas in the present case the apparatus is combined and arranged with relation to means for directing a blast or blasts of vapor against the cans.

Figure 1 is an elevation of the apparatus; Fig. 2, a plan of the same; Fig. 3, a sectional elevation upon plane of line 3 3, Fig. 2; Fig. 4, a transverse vertical section upon plane of line 4 4, Fig. 2.

I treat the edges of the cans after they leave the soldering-bath continuously and simultaneously to fluid under pressure directed to impinge against the exterior portions of the cans where they have been exposed to direct contact with the solder in the bath, the rotation of the cans upon their axes as they are advanced through the device subjecting all such exposed portions uniformly to the cleansing action of the fluid-blast and insuring the removal of superfluous solder from such adjoining portions of the end plates and can-bodies without impairing the hermetical sealing of the joints between said parts of the cans. This I accomplish by passing them between a traveling surface and a support, shown in the present instance as consisting of two endless belts A and B, one of the belts traveling faster than the other, so that the cans received at one end will be finally discharged at the other.

$r\ r$ are the supporting-rails which convey the cans from the soldering-bath, and $r'\ r'$ the supporting-rails which convey the cans from my solder-saving device.

$g\ g$ are guard-rails which preserve the alinement of the cans. The rails $r\ r$ feed the cans in between the belts A B. These belts are supported by the pulleys $a\ a'\ a^2$ and $b\ b'\ b^2$, mounted upon the shafts $d\ d'\ d^2$ and $e\ e'\ e^2$, respectively. The upper series of shafts $d\ d'\ d^2$ are adjustable vertically in their bearings, so that the space between the belts A B may be regulated accurately to meet the requirements of the cans under treatment. The pulleys $a'$ and $b'$ are idlers.

Power or speed is imparted by the power-belt P to the pulley $p$ on the shaft $d$, upon which is also mounted the pulley $t$, by which the power is transmitted through the belt T to the pulley $e^4$ upon the shaft $e^2$. The pulley $e^4$ being of greater diameter than the pulley $t$, it is obvious that the belt B will travel at a slower speed than that of the belt A. The belts travel in the direction indicated by the arrows. The dotted circles indicate the sheet-metal cans.

The vapor-pipes P' P'', one or more of which may be used, are arranged in such relation to the belts A B that the nozzles $p'\ p''$ direct the vapor into the path of the soldered edges of the cans. An effective arrangement is that shown in the drawings, especially in Fig. 4, in which opposed jets impinge upon the edge of the can-body and the edge of the end plate, thereby driving off the superfluous solder from the extreme vertex of the angle. Thus the cans fed to the device by the rails $r$ are seized by and between the belts A B, which rotate them on their longitudinal axes while presenting their edges to the action of the blasts of vapor escaping from the jets $p'\ p''$. Owing to the difference in speed of the belts A B, the cans are finally discharged onto the rails $r'\ r'$, their time of passage through the apparatus being regulated by the relative speeds imparted to said belts.

The pipes P' P" are connected with any appropriate means for supplying vapor under pressure.

I have found by experience that the removal of the superfluous solder from cans by a vapor-blast can be accomplished advantageously, the blast leaving the surfaces exposed to the solder clean, clear, and bright.

It is to be understood that I use the terms "fluid" and "vapor" herein in a broad sense as including air, steam, and other gaseous forms of matter suitable for the purpose.

What I claim as my invention, and desire to secure by Letters Patent, is—

1. In a solder-saving device, the combination of an endless traveling surface and an opposed can-support arranged to receive the cans between them, means for producing a relative motion between said traveling surface and opposed can-support whereby the cans are simultaneously rotated axially and forwarded, and means for directing fluid under pressure against the cans between said traveling surface and opposed can-support for the purpose of removing superfluous solder from the cans substantially in the manner described.

2. In a solder-saving device, the combination of two endless belts with opposed surfaces arranged to receive the cans between them, said opposed surfaces traveling in opposite directions and at different speeds, whereby the cans are spaced and forwarded by the faster-moving belt while the slower belt increases the axial rotation of the cans, and means for directing fluid under pressure against the cans rotating between said opposed traveling surfaces for the purpose of removing superfluous solder from the cans substantially in the manner and for the purpose described.

OLIN S. FELLOWS.

Witnesses:
D. W. GARDNER,
GEO. WM. MIATT.